Nov. 17, 1953    P. E. DU PONT    2,659,470
TRANSPORTATION FARE APPARATUS
Filed April 3, 1950    6 Sheets-Sheet 1

INVENTOR.
Preston E. Du Pont
BY
ATTORNEY.

INVENTOR.
Preston E. Du Pont
BY
ATTORNEY.

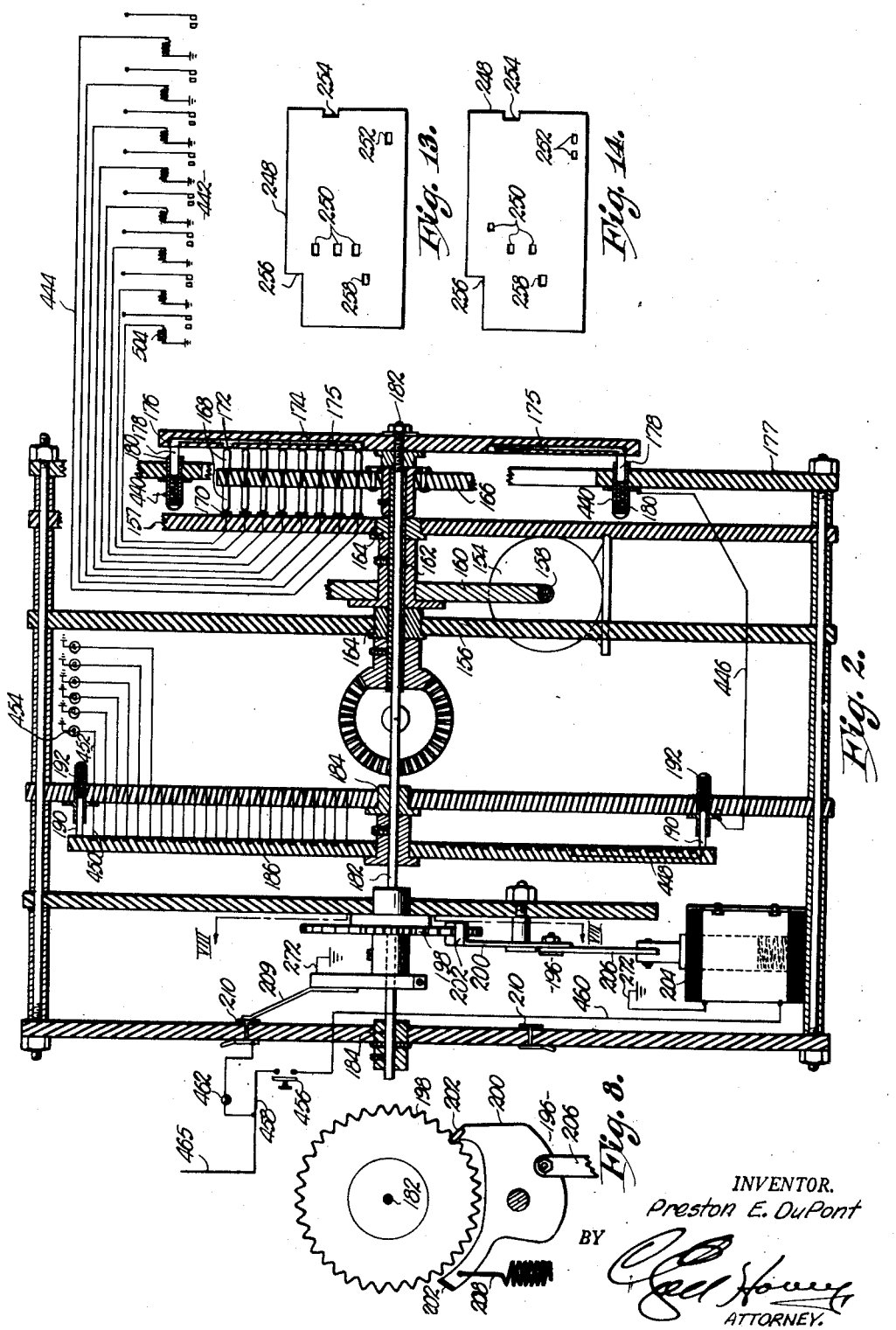

Nov. 17, 1953     P. E. DU PONT     2,659,470
TRANSPORTATION FARE APPARATUS
Filed April 3, 1950     6 Sheets-Sheet 4
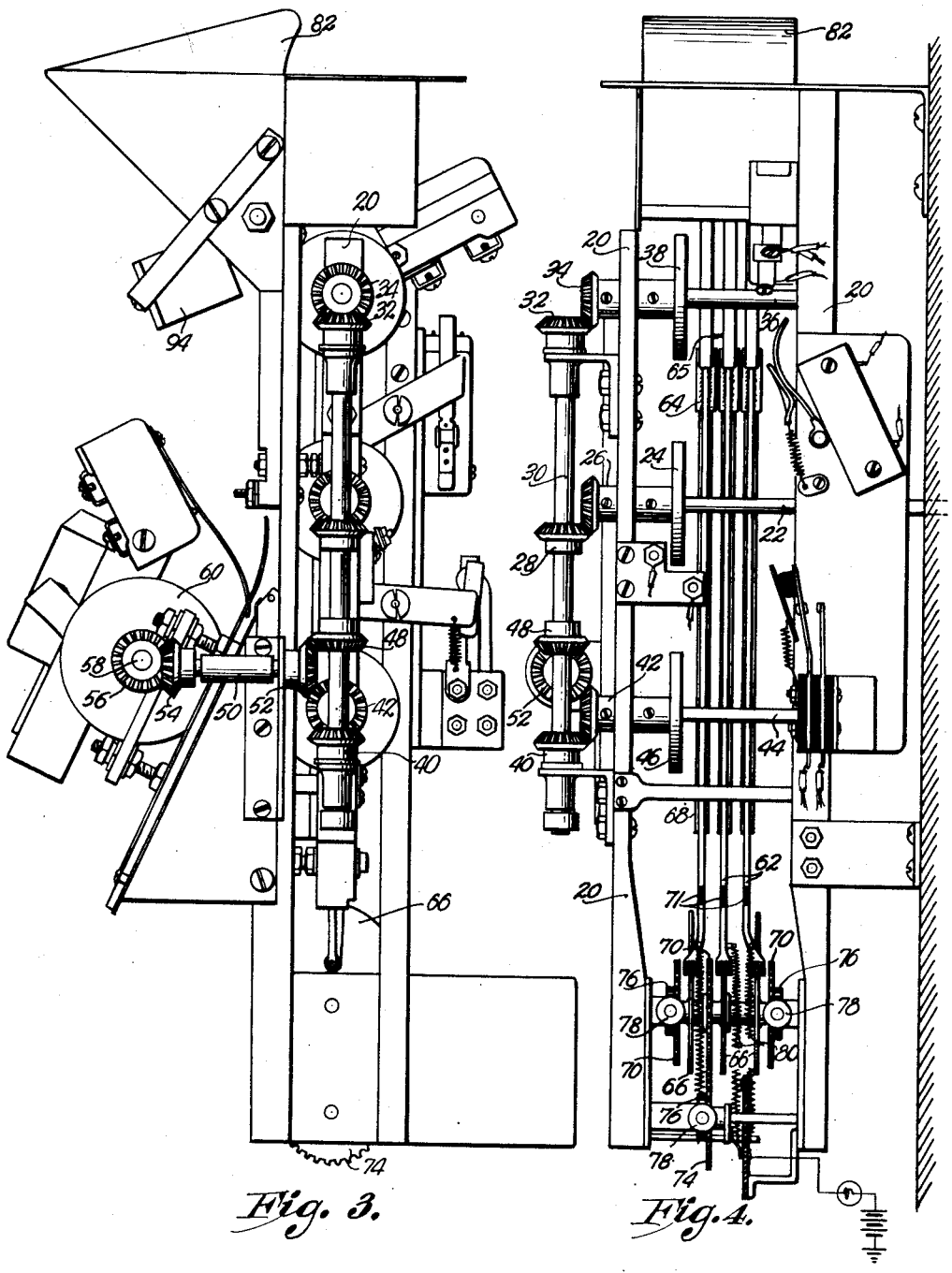
Fig. 3.     Fig. 4.
INVENTOR.
Preston E. DuPont
BY
ATTORNEY.

Nov. 17, 1953   P. E. DU PONT   2,659,470
TRANSPORTATION FARE APPARATUS
Filed April 3, 1950   6 Sheets-Sheet 5
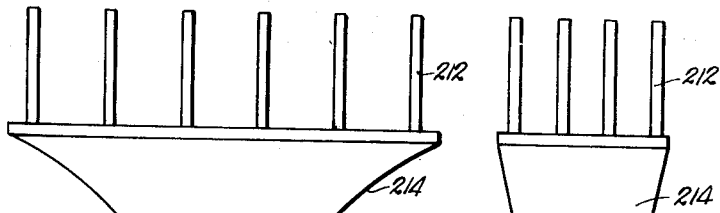
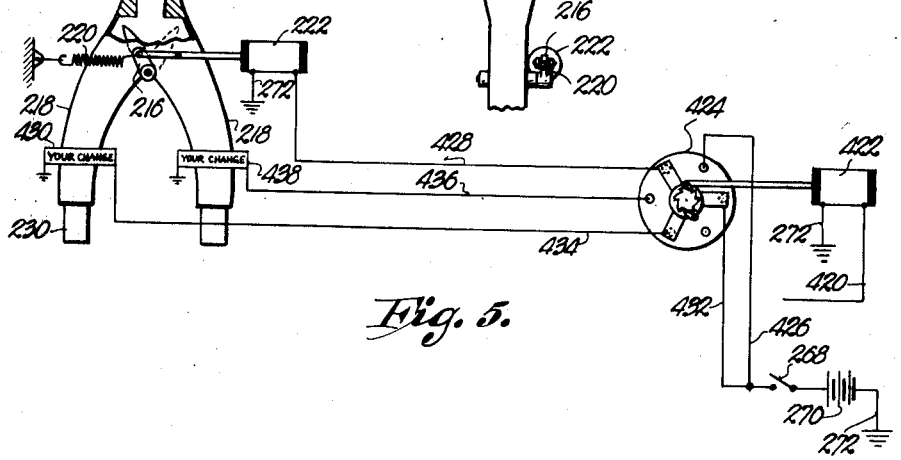
Fig. 6.
Fig. 5.
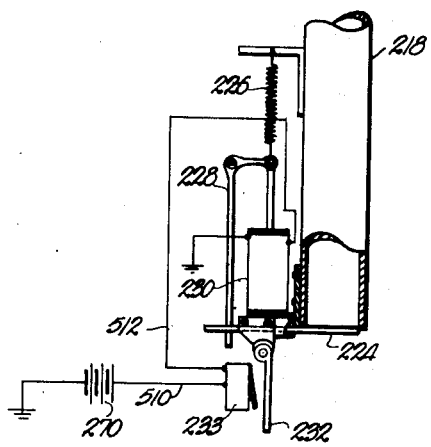
Fig. 7.
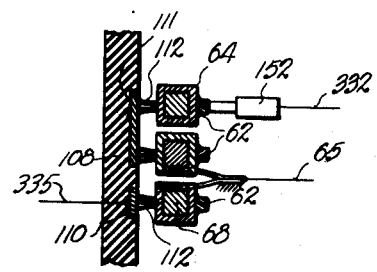
Fig. 15.
INVENTOR.
Preston E. DuPont
BY
ATTORNEY.

Nov. 17, 1953 — P. E. DU PONT — 2,659,470
TRANSPORTATION FARE APPARATUS
Filed April 3, 1950 — 6 Sheets-Sheet 6

INVENTOR.
Preston E. Du Pont
BY
ATTORNEY.

Patented Nov. 17, 1953

2,659,470

UNITED STATES PATENT OFFICE 2,659,470

TRANSPORTATION FARE APPARATUS

Preston E. Du Pont, Kansas City, Mo.

Application April 3, 1950, Serial No. 153,689

10 Claims. (Cl. 194—4)

This invention relates to a collection system for use in connection with rendering services, handling of vendable merchandise and the like and has to do with mechanism for automatically returning change to a customer in accordance with the extent of services rendered such as in connection with public conveyances and the usual fare that is paid for such services.

While the entire system of this invention may well be adapted to various fields with perhaps minor changes, the structure herein disclosed has been designed primarily for use in connection with public conveyances such as busses, streetcars and the like.

It is common knowledge that a standard fare is collected upon entering the conveyance from each passenger irrespective of where the passenger comes aboard and irrespective further of how far the passenger travels before leaving the bus or streetcar. This system is manifestly unfair not only to the public service company but to the public. Those who travel only a short distance must pay the same amount as those who travel many miles from one end of a particular line to another.

It is the primary object of the present invention therefore, to provide a system of collecting fares for public conveyances that will be proportionate in amount to the distance traveled and having as a part thereof, means to return to the customer his change in accordance with the distance traveled, irrespective of where he boards the conveyance or where he disembarks.

It is the most important object of the present invention to provide a combination card-reading device and change-return mechanism adapted for use in connection with a card punching device, all of which are mounted upon the public conveyance itself and utilized to indicate where the passenger boards the bus and to return a portion of the original fare that is paid in accordance with the distance traveled.

It is contemplated by this invention that there be provided a machine on the bus adjacent the point of entry that is capable of punching a relatively small card taking the form of a receipt for an initial set fare that is paid by each passenger upon boarding. Such mechanism is to be adapted to punch the card or otherwise mark the same, to indicate a particular zone of boarding and, as will hereinafter be made clear, such device will be progressively stepped-up by the motorman as the bus progresses from zone to zone.

Accordingly, it is an important object of the present invention to provide mechanism for receiving the aforesaid punched card as the passenger leaves the bus, to read such card and to return to the passenger before he leaves the bus, the proper amount of change in accordance with the distance travelled.

Another important object of the present invention is to provide a card-reading device having as a part thereof, mechanism that is manually stepped-up by the motorman as the bus progresses from zone to zone to the end that change will be returned to the passenger in accordance with the number of zones traversed while he remains on the vehicle.

Another important object of the present invention is to provide a system as above set forth including structure for returning change that is directly responsible to the card-reading mechanism and capable of returning one or more coins in accordance with the number of holes that are initially punched in the card and further in accordance with the number of times that a computer has been manually stepped-up by the motorman in accordance with the number of zones through which the bus travels while the particular passenger remains thereon.

Other important objects include the way in which means is provided to reject invalid cards; the manner of preventing operation except upon insertion of the card in reading mechanism in a proper manner; the manner of rendering the card-reading mechanism incapable of receiving more than one card at a time; the way in which the motorman is notified when a defective card is inserted into the card-reading device; the manner of returning the entire assembly of parts to a normal condition after each cycle of operation; the way in which fraud is prevented through mechanism that may be changed from time to time such as at the end of each run or daily as suits the desire of the service company; the way in which the entire system can be easily and quickly readjusted to vary its operation in accordance with a change in the maximum basic fare that is set by the company or a change in the desired charge sequence per zone; and the way in which the entire system is designed to render the same universally adaptable for many uses other than that particularly herein set forth.

As will hereinafter appear, the invention additionally includes a multitude of more minor objects, all of which will be made clear or become apparent as the following specification progresses.

In the drawing:

Fig. 2 is a substantially, central sectional view similar to Fig. 1b and including the latter with additional parts relating to manual step-up means for operation as the conveyance passes from zone to zone along its route.

Fig. 3 is a side elevational view of the card-reading mechanism per se.

Fig. 4 is an elevational view taken at right angles to Fig. 3.

Fig. 5 is a side elevational view of the coin return mechanism and including certain of the electrical interconnections forming a part thereof.

Fig. 6 is a fragmentary, end elevational view of the mechanism shown in Fig. 5.

Fig. 7 is a fragmentary, detailed elevational view showing a part of the mechanism illustrated in Fig. 5.

Fig. 8 is a fragmentary, cross-sectional view taken on line VIII—VIII of Fig. 2.

Fig. 13 is a side elevational view illustrating a punched card to be read by the apparatus.

Fig. 14 is a side elevational view illustrating a card of the same character as shown in Fig. 13 and punched in a slightly different manner.

Fig. 15 is a fragmentary, detailed, cross-sectional view taken on line XV—XV of Fig. 1.

Figure 1:
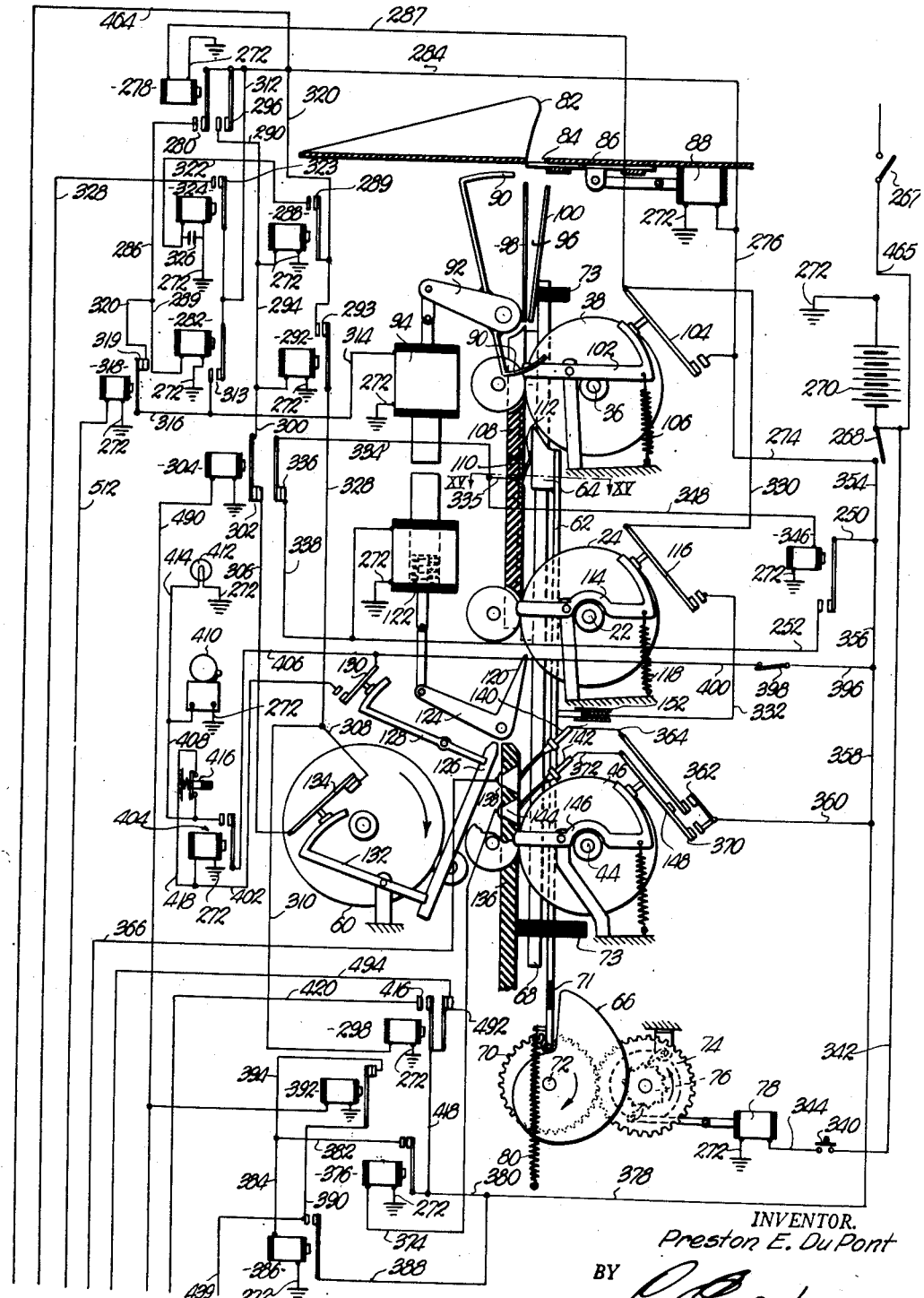
Figure 1 is a diagrammatical, schematic representation showing the card-reading mechanism and certain of the electrical parts and couplings forming a part of transportation fare apparatus embodying my present invention.

In the drawings, the numeral 20 (Figs. 3 and 4) designates a polygonal frame of the card reading portion of the apparatus. A drive-shaft 22 rotatably mounted in frame 20 has a resilient disc wheel 24 (see also Fig. 1), mounted on the shaft 22 intermediate the sides of the frame 20 and rotates with shaft 22. A pinion 26 mounted on the shaft 22 adjacent to and outside of frame 20 engages a matching pinion 28 mounted on an interconnecting shaft 30 rotatably affixed to frame 20 perpendicular to the axis of rotation of shaft 22.

A bevel pinion 32 mounted on the upper end of shaft 30 engages a matching pinion 34 affixed to a shaft 36 which is rotatably mounted in frame 20 in parallel relationship to shaft 22. A resilient disc wheel 38 is mounted on shaft 36 and rotates therewith.

A bevel pinion 40 affixed to the lower end of shaft 30 engages a pinion 42 which is mounted on the end of a shaft 44 adjacent to and outside of frame 20. Shaft 44 is rotatably mounted in frame 20 in parallel relationship to shaft 22. A resilient disc wheel 46 is mounted on shaft 44 intermediate the sides of frame 20.

A bevel pinion 48 mounted on shaft 30 intermediate pinions 28 and 40 engages a pinion 52 mounted on a rearwardly extending shaft 50 rotatably mounted to frame 20. A bevel pinion 54 on the end of shaft 50 engages a matching pinion 56 affixed to the end of a transverse shaft 58 rotatably mounted to frame 20 and having a resilient disc wheel 60 mounted thereon.

A plurality of push rods 62 (Figs. 1, 4 and 15) each having a tubular slide 64 affixed to the upper end thereof, engage a like number of cams 66, the rotation of which impart reciprocable motion to rods 62 and their slides 64. A parallel guide rod 68 rigid to frame 20 is provided for each slide 64 respectively. Rods 62, slides 64 and guides 68 are all of electrically conducting material, rods 62 each having an insulating strip 71 therein separating the same electrically from cams 66. Guides 68 are joined to frame 20 by brackets 73 of insulating material and two of the guides 68 are electrically joined by a flexible, Y-shaped, conductor 65. Each slide 64 has an electrical current conducting brush 112 attached thereto.

Cams 66 are positioned individually by gears 70 affixed to cams 66 and rotatably mounted on a common shaft 72 with cams 66. The center gear 70 is driven by a corresponding gear 74 rotatably mounted on frame 20 and each gear 70 is rotated by a conventional ratchet mechanism 76 which is in turn actuated by a solenoid 78. One of the mechanisms 76 is on gear 74, the remainder being directly on the two outer gears 70. Coil springs 80 affixed to frame 20 and push rods 62 bias rods 62 into engagement with their cams 66.

A curved guiding shield 82 is disposed at one side of a slot-like opening 84 in frame 20, and a slidable door 86 is movable in and out of closing relationship with opening 84 by the action of a solenoid 88. A pair of spaced-apart gates 90 are secured to a pivotally mounted crank 92 which is rotatably mounted on frame 20 and actuated by a solenoid 94. Gates 90 alternately move in and out of closing relationship with an elongated, vertical card passageway 96 beneath opening 84. A sectional vertical slide plate having sections 98, 108 and 136 forms the rear wall of way 96. A guide plate 100 below opening 84 converges with section 98 as the lowermost end thereof is approached.

A pivotally mounted cam lever 102, spring-loaded as at 106, extends into passageway 96 and closes a normally open switch 104 when lever 102 is moved downwardly in passageway 96.

The section 108 is of dielectric material and has a pair of elongated, vertical metallic strips 110 and 111 embedded in one face thereof. The brush 112 of one rod 62 slidably engages strip 110 (Fig. 15) while brushes 112 of two additional rods 62 slide on strip 111 as cams 66 and rotated. It is noted that the flexible conductor strip 65 connects guides 68 of one of the two rods 62 with the guide 68 of the single rod 62 of strip 110 and that a brush 152 slidably engages the other of the pair of rods 62.

A lever 114 pivotally mounted intermediate the ends thereof to frame 20 extends into passageway 96, the opposite end being cam shaped and engaging a switch 116. Switch 116 is normally open and is closed by lever 114 when the end in passageway 96 is moved downwardly. A spring 118 biases lever 114 into the normal position with switch 116 open, the spring 118 being attached to one end of lever 114 and to the frame 20.

A wedge-shaped, diverting plate 120 is pivotally mounted to frame 20 with the apex edge thereof movable into and out of the passageway 96. A solenoid 122 is connected to an arm 124 attached to one side edge of plate 120 for actuating the latter, and an elongated, rigidly mounted diverting plate 126 is located in alignment with plate 120 when the latter is across the passageway 96.

A pair of swingable levers 128 and 132, each extend at one end beyond the plate 126 and have their opposite ends cam-shaped for closing a normally open switch 130 and opening a normally closed switch 134 respectively.

Lower section 136 is formed of dielectric material and extends downwardly from diverting plate 120. Metallic conductors 138 and 144 embedded in section 136 receive conducting resilient brushes 140 and 142 respectively mounted on frame 20 and insulated therefrom.

A spring-loaded lever 146 pivotally mounted intermediate the ends thereof to frame 20 extends across passageway 96 and operates a double pole, single throw switch 148.

Figures 1A, 1B:
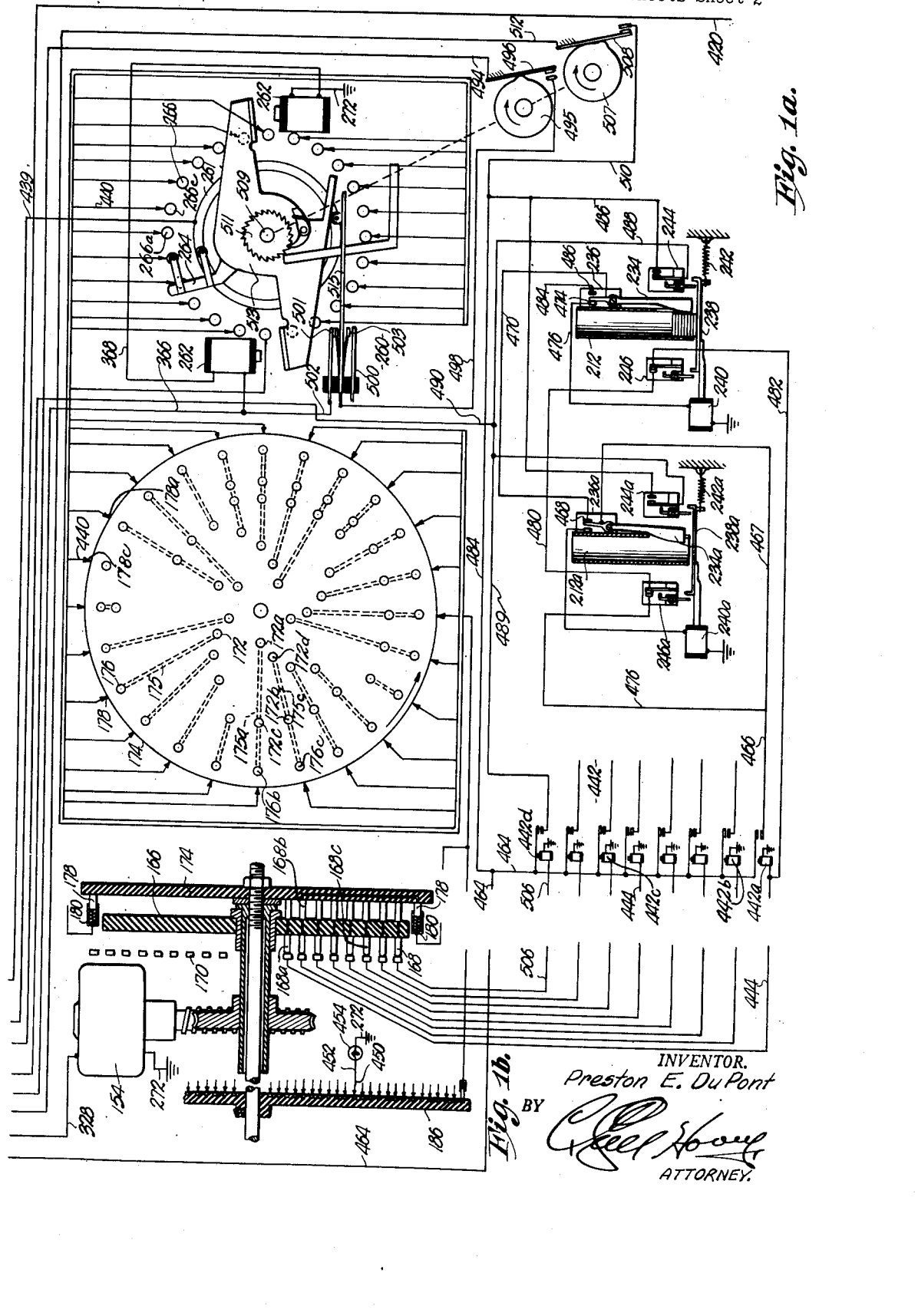
Fig. 1a is a schematic diagram illustrating in part structure responsive to the aforesaid reading mechanism and including a portion of the structure for returning change in accordance with the functions of the card-reading assembly.
Fig. 1b is a fragmentary, schematic view illustrating the prime mover, its manner of continuously driving an arm having contact brushes thereon, and the way in which such structure is electrically coupled.
Figure 9:
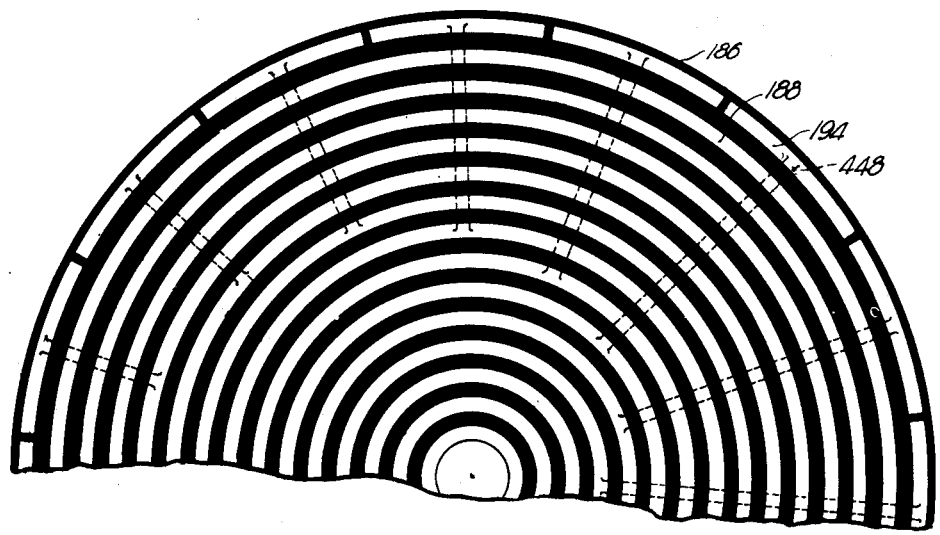
Fig. 9 is an enlarged, fragmentary, side elevational view illustrating a control disc forming a part of the structure for indicating to the operator or passenger the amount of fare returned to a passenger, or amount of fare charged, whichever is desired.
Figures 10, 12:
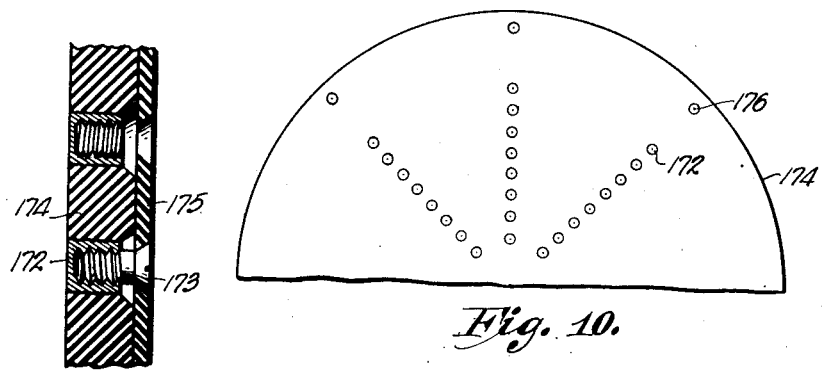
Fig. 10 is a fragmentary, rear elevational view of the main control disc for determining the amount of fare to be returned.
Fig. 12 is an enlarged, fragmentary, cross-sectional view taken on line XII—XII of Fig. 11.
Figure 11:
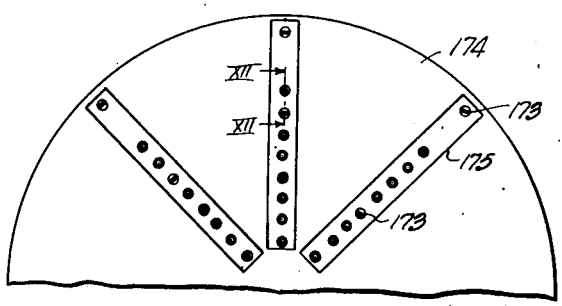
Fig. 11 is a fragmentary, front elevational view of the disc shown in Fig. 10.

A prime mover 154 (Fig. 2) mounted on a rigid, sectional frame 156, is connected by worm 158 and gear 160 to rotate a hollow shaft 162 having gear 160 thereon. Shaft 162 is journalled in bearings 164 supported in frame 156, and a dielectric arm 166 is affixed to one end of shaft 162. A plurality of resilient fingers 168 (Figs. 1b and 2) mounted in two groups along radial lines in opposed relationship to each other on arm 166 engage individually an equal number of concentric slip rings 170 mounted on a dielectric portion 157 on frame 156 and contact points 172 mounted in the face of rotatable disc 174 (Figs. 1a, 1b and 2). The fingers 168 function to make an electrical circuit between slip rings 170 and contact points 172. Points 172 may be selectively joined together by conductor strips 175 (see also Figs. 10 to 12 inclusive) which terminate at a contact point 176 near the periphery of disc 174 where they are engaged by a spring-loaded brush 178 reciprocably mounted in a brush holder 180 affixed to frame 156. Points 172 have an internally threaded recess to receive a screw 173 which will complete the electrical circuits between strips 175 and points 172.

Disc 174 is mounted on one end of shaft 182 and is carried and rotated thereby. Shaft 182 extends through and beyond hollow shaft 162 and is further supported in bearings 184 mounted in frame 156. A second disc 186 formed of dielectric material is mounted on shaft 182 and rotates therewith. A plurality of concentric slip rings 188 in spaced-apart relationship are disposed on one face of disc 186 and a plurality of spring-loaded brushes 190 reciprocably mounted in brush holders 192 attached to frame 156 engage a plurality of equally spaced electrical contacts 194 located in spaced-apart relationship around the periphery of disc 186.

Shaft 182 is positioned by an escapement mechanism 196 (Fig. 8) having a toothed wheel 198 mounted on shaft 182. The number of teeth on wheel 198 is equal to the number of contacts 194 on disc 186 and contacts 176 on disc 174. A lever 200 having thereon a pair of spaced-apart pallets 202 is pivotally mounted to frame 156. A solenoid 204 (Fig. 2) is connected to lever 200 by a link 206 which moves the lever 200 in one direction against the action of the spring 208. A resilient brush 209 mounted on shaft 182 engages a circular row of contacts 210, there being one contact for each position of the shaft 182.

A plurality of coin holders 212 (Figs. 5 to 7 inclusive) which store coins of various denominations are disposed over a funnel-shaped chute 214. Immediately below the chute 214, a swingable gate 216 is pivotally mounted at the intersection of a pair of conduits 218 having the opposed ends in spaced-apart relationship. Gate 216 is held in its normal position by a spring 220 and moved therefrom to a second position designated by the broken lines in Fig. 5 by the action of a solenoid 222.

A slidable door 224 (Fig. 7) closes the lower end of each of the chutes 218 respectively and is held in a normally closed position by a spring 226 acting through a pivotally mounted bell crank 228. A solenoid 230 opens door 224 by overcoming the pull of spring 226 and rotating crank 228, one end of which engages door 224. A striker plate 232 engages a switch 233 when touched by the operator's hand being placed in change-receiving position beneath the end of chute 218.

A lever portion 234 (Fig. 1a) of a lever operated switch 236 extends into each coin tube 212 respectively and has its position determined by the presence or absence of coins in tube 212. An ejector slide 238 beneath each coin tube 212 is arranged to discharge a predetermined number of coins for each operation, when actuated by a solenoid 240. Ejector 238 is returned to its normal position of operation by the biasing effect of a spring 242. Movement of the slide 238 actuates a normally open switch 244 and a normally closed switch 246. Ejector slide 238 may be used to discharge either a single coin or a plurality of coins by varying the thickness thereof as required for the different holders 212.

In Fig. 13, a card 248 is shown having openings punched therein which are arranged to actuate the apparatus. A plurality of holes 250 are used to complete an electrical circuit only when they are arranged in a predetermined pattern. This allows a combination to be set up which will detect a spurious card and cause its rejection. A plurality of holes 252 are disposed to introduce the zone or other information as to the point of beginning of service. A notch 254 is located at one side of the center of the edge of the card first introduced into the card reader.

The notch 254 makes impossible the acceptance of the card 248 unless properly introduced into the device so that it may be correctly scanned. A second notch 256 in card 248 is disposed in one edge thereof to provide for the opening of switch 148 (Fig. 1) before the card has completed its passage beneath brush 142 and to also permit opening of switch 104 at the proper moment. A hole 258 opposite notch 256 and spaced therefrom provides for the energization of slip ring 261 (Fig. 1a) on stepping switch 260. Switch 260 is a conventional stepping switch wherein each impulse to a pair of magnetic coils 262 advance a contactor 264 to the next of a plurality of contacts 266.

With a main disconnecting switch 268 closed (Fig. 1) power is available to operate the equipment from a battery 270 having one terminal thereof connected to ground 272 as generally installed on transportation vehicles.

Upon closing switch 268 by the operator of the vehicle, the solenoid 88 is energized through the following circuit:

From battery 270 through closed switch 268, wires 274 and 276 and solenoid 88 to ground 272.

Operation of solenoid 88 removes gate 86 from opening 84 and allows insertion of card 248 into passage 96. Until power is supplied for operation of the equipment insertion of the card 248 into opening 84 is thus prevented.

Insertion of a card 248 formed and punched as shown in Fig. 13, vertically into passage 96 with the edge having notch 254 leading, will actuate the various parts of the card reading device as card 248 travels through passage 96. When the card 248 is properly inserted, notch 254 thereof engages the lower arm 90 while the adjacent edge of the card strikes lever 102, causing rotation thereof and closing of switch 104. If the card is improperly inserted, notch 254 will not register with lower arm 90 and the edge of card 248 will strike arm 90 and be held away from lever 102. When switch 104 is not actuated, passage of a card through the reading mechanism is prevented by lower arm 90. When switch 104 is closed, the coil of a relay 278 is energized as follows:

From battery 270 through closed switch 268, wire 274, closed switch 104, line 287 and the coil of relay 278 to ground 272.

When the coil of relay 278 is energized, a pair of normally open contacts 280 is closed, thereby energizing solenoid 94 through a circuit traceable from battery 270, through closed switch 268, wires 274, 276, and 284, closed contacts 280, wires 286 and 320, closed contacts 319, wires 316 and 314, the coil of solenoid 94, to ground 272; and the coil of a relay 282 is energized through the following circuit:

From battery 270 through closed switch 268, wires 274, 276 and 284, closed contacts 280, wires 286 and 289, and the coil of relay 282 to ground 272.

This closes contacts 313 of relay 282 to energize a holding circuit for solenoid 94 as follows:

From battery 270 through closed switch 268, wires 274, 276, 284 and 312, closed contacts 313, wire 314, and solenoid 94 to ground 272.

Solenoid 94 actuates gates 90 and moves the lower of the pair of gates 90 out of the passageway 96 and moves the upper of the pair of gates 90 into the passageway 96 immediately below opening 64 and obstructs the insertion of another card 248 into the reading device until the cycle has been completed and all electrical circuits are reset. Solenoid 94 holds upper gate 90 in the closed position after the card has passed lever 102, which returns to its normal position and allows switch 104 to open, by virtue of the following holding circuit for relay 282:

From battery 270 through closed switch 268, wires 274, 276, 284 and 312, closed contacts 313, wire 316, normally closed contacts 319 of a relay 318, wires 320 and 289 and the coil of relay 282 to ground 272.

Thus, relay 282 and solenoid 94 remain energized until the coil of the relay 318 is energized.

Energization of relay 278 also closed contacts 296 to energize the coils of relays 288, 292 and 298, all coupled to ground 272 and in parallel with the following circuit:

From battery 270, through closed switch 268, lines 274, 276 and 284, closed contacts 296, lines 290, 294 and 300, normally closed contacts 302, line 306, normally closed switch 134 and lines 308 and 310.

Closing of contact points 289 of relay 288 completes the following circuit through the coil of a relay 324:

From battery 270, through closed switch 268, lines 274, 276, 284 and 320, closed contacts 289, line 322 and the coil of relay 324 to ground 272. Relay 288 has a holding circuit as hereinafter described and the relay 324 is held closed until relay 288 is deenergized.

An electrical condenser 326 is connected in parallel with the coil of relay 324 and has a capacity sufficient to hold the contacts thereof closed for a short interval after the power supply to the coil has been terminated. When contact points 323 of relay 324 are closed, the following circuit is completed through the prime mover 154:

From battery 270 through closed switch 268, lines 274, 276, 284, 312, closed contacts 323, line 328 (Figs. 1 and 1b) and prime mover 154 to ground 272.

Relay 292 is held closed by a circuit traced as follows:

From battery 270, through closed switch 268, lines 274, 276, 284 and 320, closed contacts 293, lines 328 and 308, normally closed switch 134, line 306, normally closed contacts 302, line 300 and the coil of relay 292 to ground 272. Relay 288 is held closed through the above circuit and continuing through line 294.

Relay 298 is held closed as follows:

From battery 270 through closed switch 268, lines 274, 276, 284 and 320, contact points 293, lines 328 and 310 and the coil of relay 298 to ground 272.

Although switch 104 opens as card 248 passes downwardly in passage 96 beyond arm 102, thereby deenergizing relay 278 and opening contacts 280 and 296, relays 282, 288, 292, 298 and 324, solenoids 88 and 94 and motor 154, all remain energized. Thus, upper gate 90 remains in the closed position and prime mover 154 continues to operate until switch 134 opens or the circuit to the coil of relay 304 is energized as hereinafter more fully explained.

Prime mover 154 rotating wheel 38, moves card 248 downwardly past section 106 and arm 114 is actuated to close switch 116. As soon as openings 250 of card 248 register with brushes 112 to establish electrical connection with strips 110 and 111, and while switch 104 remains closed, solenoid 122 is energized to withdraw plate 120 from passage 96 through the following circuit:

From the battery 270, through closed switch 268, line 274, closed switch 104, line 330, closed switch 116, line 332, brush 152, push rods 62, brushes 112, strips 110 and 111, lines 335, 334 and normally closed contact points 336 of relay 304, line 338 and solenoid 122.

The action of the brushes 112 in making electrical contact through the openings 250 in card 248 is to provide a means of determining the validity of the card 248 before it continues further through the card reading device. By the use of a plurality of brushes 112 it is possible to arrange a large number of different patterns for the arrangement of openings 250. The predetermined arrangement of brushes 112 will serve to allow the rejection of all cards 248 which do not have openings 250 in the predetermined arrangement. Unless the openings 250 are in the predetermined pattern and all of the brushes 112 make contact therethrough at the same instant, the circuit to solenoid 122 will not be completed, deflector 120 will not be moved out of passageway 96, and card 248 will be rejected along slide plate 126 by frictional engagement with wheel 60 which is rotated by prime mover 154. It is necessary to connect the brushes 112 and plates 110 and 111 in series electrically as above described to provide the feature that all of brushes 112 must engage an opening 250 at the same time to make the circuit complete. With the brushes 112 arranged to make contact through holes 250 as shown in Fig. 13, it would be impossible to complete the circuit by the use of a card 248 having a hole arrangement such as shown in Fig. 14 or any other arrangement not as shown in Fig. 13.

Brushes 112 are positioned by the rotation of cams 66 which produce longitudinal motion of push rods 62. An individual cam 66 being provided for each of the plurality of brushes 112 allows the arranging of a large number of pattern combinations.

Cams 66 are rotated by the action of the similar number of solenoids 78 on mechanisms 76 to provide a series of positions for each brush 112 along its path of travel. A solenoid 78 is energized by the operation of a push button switch 340 which completes the following circuit:

From battery 270, through line 342, a closed switch 340, line 344, a solenoid 78, to ground 272.

The number of positions of each brush 112 along guides 68 depends therefore, on the number of teeth on ratchets 76, and it is apparent that brushes 112 may be selectively moved from one position, horizontally aligned to a large number of relative positions as desired. The setting can be changed periodically and quickly by merely actuating one or more switches 340 to prevent fraud and to foil any attempt to "beat" the system.

When the brushes 112 make contact through openings 250 in card 248, the coil of a relay 346 is energized, the circuit being traced as follows:

From battery 270, through closed switch 268, line 274, closed switch 104, line 330, closed switch 116, line 332, brush 152, one of rods 62, brush 112, strip 111, center rod 62, electrically coupled brushes 112, another rod 62, brush 112, plate 110, lines 335 and 348, coil of relay 346 to ground 272. Thus, solenoid 122 is maintained in an energized condition by the following circuit:

From battery 270, through closed switch 268, lines 354 and 250, closed contacts of relay 346, line 252 and solenoid 122 to ground 272. This event takes place before the card 248 reaches diverter 120.

Relay 346 is held closed until relay 304 is energized as follows:

From battery 270, through closed switch 268, lines 354 and 250, the closed contacts of relay 346, lines 252 and 338, normally closed contacts 336, lines 334 and 348 and relay 346 to ground 272.

With diverter 120 held out of passageway 96, card 248 will be moved between plate 136 and brushes 140 and 142 and ultimately be moved to the end of its path of travel by frictional engagement with the rotating wheel 46. As card 248 moves along, brush 140 will register with one or more holes 252 in card 248 and make electrical contact with conductor 138. Brush 142 registers with hole 258 as the card 248 moves through passageway 96, after all of the holes 252 have passed brush 140. The leading edge of card 248 strikes lever 146 and rotates the same which closes switch 148. The relative locations of brushes 140 and 142 and lever 146 are arranged so that switch 148 will be closed before and during the register of brushes 140 and 142 with holes 252 and 258 respectively.

Downward movement of card 248 to break the circuits through brushes 112 and strips 110 and 111 and to reopen switch 104, will have no effect on withdrawn gate 120 because of the holding circuit through closed contacts 336 as above set forth. Also, reopening of switch 104 to deenergize solenoid 278 will have no effect on upper gate 90 nor upon the energized condition of relays 282, 288, 292, 298 and 324, as well as solenoids 88 and 94 and motor 154 as above analyzed.

With switch 148 closed and one of holes 252 receiving brush 140, the pair of solenoids 262 (Fig. 1a) will be energized as follows:

From battery 270 through closed switch 268, lines 354, 356, 358, 360, closed contacts 362 on switch 148, line 364, brush 140, conductor 138, line 366, one solenoid 262, line 368 and a second solenoid 262 to ground 272.

Thus, for each hole 252, solenoids 262 are energized once and arm 264 is advanced to a new position around its path of travel.

With brush 142 in register with hole 258 in card 248 and switch 148 closed by the action of card 248 on lever 146, a relay 376 is energized as follows:

From battery 270, through closed switch 268, lines 354, 356, 358 and 360, closed contact points 370 on switch 148, line 372, brush 142, conductor 144, line 374 and the coil of relay 376, to ground 272.

When the coil of relay 376 is energized, a relay 386 is energized as follows:

From battery 270, through closed switch 268, lines 354, 356, 358, 378 and 380, closed contact points of relay 376, lines 382 and 384, and the coil of relay 386 to ground 272.

A holding circuit for relay 386 is traced as follows:

From battery 270, through closed switch 268, lines 354, 356, 358, 378 and 388, closed contact points of relay 386, line 390, normally closed contact points of relay 392, lines 394, 384 and the coil of relay 386 to ground 272.

Thus, the coil of relay 386 remains energized even after brush 142 is interrupted by continued downward movement and after switch 148 is reopened, until the coil of relay of 392 is energized and the normally closed contacts of relay 392 are thereby opened. After the card 248 has passed brushes 140 and 142, and lever 146 is released, thus returning switch 148 to its normally open position, and deenergizing relay 376 but not relay 386, card 248 has completed the reading cycle and is discharged from the passageway 96.

In the event that the combination circuit through brushes 112 is not made, diverter plate 120 is not removed from the passage 96 and the card 248 follows the alternate path along slide plate 126. In following the alternate or rejection path, lever 128 is actuated by the leading edge of card 248 and the normally open switch 130 is closed thereby.

When switch 130 is closed, a relay 404 is energized as follows:

From battery 270 through closed switch 268, lines 354, 356 and 396, a normally closed manual switch 398, line 400, closed switch 130, line 402 and the coil of relay 404 to ground 272.

When the coil of relay 404 is thus energized, the following circuit may be traced to an alarm bell 410:

From battery 270, through closed switch 268, lines 354, 356 and 396, closed switch 398, lines 400, 406, closed contact points of relay 404, line 408 and alarm bell 410 to ground 272.

An indicating lamp 412 is connected in parallel with bell 410 through line 414 to ground 272. A circuit through a normally closed push button switch 416 maintains the coil of relay 404 in an energized condition after switch 130 is closed by connecting from line 408 to switch 416, through line 418 to the coil of relay 404. The alarm 410 will continue to operate until it is silenced by the opening of push button 416 and the alarm system may be removed from service by opening the manual switch 398. The function of the alarm 410 is to notify the operator of the vehicle that an attempt had been made to use a spurious card and that the card had been rejected.

As the rejected card 248 continues along slide plate 126, lever 132 is actuated by the leading edge of the card 248 which opens the normally closed switch 134 thus deenergizing the coils of relays 292 and 288 which in turn allows the contact points of relay 208 to open and deenergize the coil of relay 324. When the contacts of relay 324 open as a result of its coil being deenergized, the operation of prime mover 154 is discontinued. Opening of contacts 293 deenergizes relay 298, but relay 282 and solenoid 94 remain energized to keep upper gate 90 closed. The apparatus is not automatically reset and upper gate 90 opened when a rejected card 248 passes through the mechanism since upon hearing alarm 410 and seeing light 412, the operator may desire to investigate. He thereupon deenergizes the entire electrical system to open upper gate 90 by opening switch 268. After card 248 passes lever 132, it has completed the rejection cycle and leaves the machine.

Reverting again to the operation when card 248 is accepted, the coil of relay 298 being energized, closes a set of normally open contacts 416 which in turn closes the following circuit through a solenoid 422 (Fig. 5) :

From battery 210, through closed switch 268, lines 354, 356, 358, 378, 380, 418, closed contact points 416, line 420 and solenoid 422 to ground 272.

When solenoid 422 is energized, it actuates a triple pole double throw switch 424 which controls circuits to the change dispension device. When switch 424 is in the position shown in Fig. 5, current from battery 270 will flow through line 432, switch 424, line 428 to solenoid 222 and energize the same. Gate 216 will immediately assume the dotted line position shown in Fig. 5. An illuminated indicator 430 is connected to battery 270 through line 432, switch 424 and line 434.

When another card is inserted and the reading cycle is begun again, solenoid 422 is energized and switch 424 is actuated into the alternate position in which solenoid 222 returns gate 216 to its normal position. In the alternate position, switch 424 completes a circuit from battery 270 through line 432, switch 424, line 436 to illuminate indicator 438.

Change from tubes 212 and funnel 214 is therefore dumped alternately into branches 218 by the gate 216 for delivery to customers upon opening gate 224. If one customer is slow in receiving his change, the change of a second customer placing a card in passage 96 will pass to the other branch 218. Once energized, solenoid 222 remains so until the next card 248 is deposited or until switch 268 is reopened.

Each of contact points 266 is connected to a corresponding brush 178 of the annular series of brushes 178 on stationary member 177 (Figs. 1a, 1b and 2), by a plurality of lines 440 which are connected to points 266 and holders 180 for brushes 178. Brushes 178 each engage one of contacts 176 in the outermost row thereof on disc 174, which conduct electrical energy to connecting strips 175 which may be in turn connected by the insertion of screw 173 (Fig. 12) to any or all of the contact points 172 along the radial line coinciding with the strip 175 on the face of disc 174.

The arm 166 is rotated continuously by prime mover 154 and the plurality of brushes 168 close the circuits, from contacts 172 to energize the corresponding slip rings 170 on plate 157. Each of slip rings 170 is connected electrically to the corresponding coil of a relay broadly designated by the numeral 442.

With the relay 386 held energized, one or more of the coils of relay 442 are energized as follows:

From battery 270 (Fig. 1) through closed switch 268, lines 354, 356, 358, 378 and 388, closed contacts of relay 386, line 439 (Figs. 1 and 1a), slip ring 261 of switch 260, arm 264, one contact 266 then engaged by arm 264, one line 440 (Figs. 1a, 1b and 2), a corresponding holder 180 and its brush 178, a contact 176 and its strip 175, points 172, brushes 168, slip rings 170, lines 444 and certain of the coils of relay 442 to ground 272.

It is to be understood at this point that there is a brush 168, a coil in group 442 and a coin tube 212 (Figs. 5 and 6) for each coin denomination respectively and for each plural discharge possibility required for certain of the denominations to be used in making change. Thus, the strips 175 are variously connected with one or more contacts 172. Accordingly, the brush (or brushes 168) that is charged, depends upon how many times switch 260 has been stepped (as determined by the number of openings 252 in card 248) and the position of arm 264 when ring 261 (Fig. 1a) is energized.

A brush 190 is connected in parallel with each brush 178 respectively and a circuit from the brush holder 180 of the circuit last traced is completed as follows:

From said brush holder 180 through a line 446, a brush 190, one contact 194 on disc 186, a connecting strip 448, a contact 188, a brush 450, one line 452, and an indicating lamp 454 to ground 272.

Disc 186 on shaft 182 is stepped up by the rotation of shaft 182 through solenoid 204 and escapement 196 in the same manner as disc 174 and the annular series stationary brushes 190 are each connected in parallel with a respective brush 176. With this arrangement, calibrated indicating lights 454 will function to indicate the amount of return fare due as the computer calculates the amount due by the information from card 248 and the position of disc 186 as determined by the distance the vehicle has traveled or the zone in which the vehicle is presently operating.

Discs 174 and 186 are positioned by the operator of the vehicle through a remote control push button 456 which completes the following circuit for the escapement mechanism 196 through solenoid 204:

From battery 270 (Fig. 1) through a switch 267 to be closed by the operator, line 465 (Figs.

1 and 2), line 458, closed switch 456, line 460 and solenoid 204 to ground 272.

The annular series of stationary contacts 210 (Fig. 2) each having a calibrated indicating lamp 462, correspond to each position of discs 186 and 174, i. e. the number of teeth in escapement gear 198, and the circuit for one lamp 462 is traced as follows:

From battery 270 (Fig. 1) through closed switch 267, line 465 (Figs. 1 and 2), line 458, a lamp 462, a contact 210 and brush 209 to ground 272.

Observation of the indicating lamp 462 which is glowing will give the operator of the vehicle information as to the setting of discs 186 and 174.

It is noted in Fig. 1a that a pair of coin tube assemblies is illustrated. Both are adapted to handle the same denomination, one coming into operation when the other is depleted of coins. Each of the relays of series 442 operates a pair of such assemblies. Assuming therefore, one of these relays, designated as 442a to have been closed by charging ring 261, the circuit for energizing relay 240 to return a coin as change, is traced as follows:

From battery 270 (Fig. 1) through closed switch 268, lines 274, 276, 284 and 464 (Figs. 1 and 2), closed contacts of relay 442a, lines 466 and 467, lever 234a of empty tube 212a, contact 468 of switch 236a, line 470, lever 234, contact 474 of switch 236, line 476 and solenoid 240 to ground 272.

Relay 442a is held closed by a circuit from line 466 through line 476, the normally closed contacts of switch 246a, line 480, switch 246, line 482 to the coil of relay 442a.

Operation of solenoid 240 actuates coin slide 238 which allows one or a plurality of coins to be discharged according to the form of gate 238 and further opens switch 246 which deenergizes the coil of relay 442a and deenergizes solenoid 240. As can be seen, the function of switch 236a is to transfer control to coin tube 212 when the supply of coins in tube 212a is exhausted. Line 484 connected to contact 486 of switch 236 may be connected to a third coin dispenser if desired, to go into operation and become energized when the absence of coins allows lever 234 to move into the coin tube 212.

Prime mover 154 is deenergized through the action of coin slide 238 closing the normally open contacts of switch 244, thus supplying voltage to the coil of relay 304 (Fig. 1) by means of a circuit from power line 464, through lines 484 and 486, closed switch 244, lines 488 and 490, and the coil of relay 304 to ground 272.

When relay 304 opens contacts 302, it also deenergizes the coils of relays 288, 292 and 298. When the contacts of relay 288 open, relay 324 is deenergized with a delay caused by electrical condenser 326 and the power supply to prime mover 154 is cut off by the opening of the contacts 323 of relay 324. The delay assures discharge of either the rejected or accepted card before stopping of motor 154.

When relay 292 is deenergized, the coil of relay 298 is deenergized which allows contacts 416 to open and deenergize slip ring 261 on stepping switch 260. In Fig. 1a, there is shown a pair of cams 495 and 507 for operating normally open switch 508, and normally closed switch 496 respectively. Cams 495 and 507 are ganged together for rotation with a rotatable shaft 509 that is rigid to ratchet 511 and armature 513 of switch 260. Consequently, as soon as solenoids 262 are initially energized by the action of card 248 in passage 96 to step-up arm 264, one or more positions, cam 495 is rotated to close switch 496.

It is always necessary to return arm 264 to a "home" position, i. e. that shown in Fig. 1a, at the end of each cycle of operation, by continuing the rotation of arm 264 from the point to which it was initially stepped by card 248 to said "home" position and continuing the rotation of cam 495 to reopen switch 496.

With switch 496 closed, the following circuit through solenoids 262 is made when contacts 492 of relay 298 are reclosed by deenergization of relay 298:

From battery 270 through lines 354, 356, 358, 378, 380, 418, points 492, line 494 (Figs. 1 and 1a), the cam switch 496, line 498, closed contacts 501 of a switch 500, line 502, to solenoids 262.

Each time armature 513 is actuated, it swings a flexible bar 515 to alternately close contacts 501 and 503 of switch 500. Thus, continuous stepping of switch 260 will move cam 495 to a position, as shown opening switch 496. Thus the switch 260 is "motored" to home or normal position where switch 496 is open and solenoids 262 are thereby deenergized.

When switch 134 is opened by the rejection of a card 248, a similar result is obtained as when points 302 open, it being necessary to return the device to normal and terminate the operations of its components.

When relay 304 is energized and contacts 336 are opened, the coil of relay 346 is deenergized and the contacts thereof are opened which cuts off the power supply to solenoid 122 and diverter plate 120 returns to a position across passageway 96.

In the event that the fare owed is equal to the amount deposited for the card 248 and consequently the coin dispenser would not be required to return change, a separate circuit is provided to perform the function of switch 244. The coil of relay 442d connected to one of the slip rings 170, is energized by an electrical impulse therefrom through a line 506. When the contact points of relay 442d are closed, a circuit is made from power line 464 through the points of relay 442d and line 489 and 490 to the coil of relay 304. Thus the device is brought into normal condition in readiness for another cycle of operation.

Immediately before switch 260 has completed its motoring to "home" position, cam switch 508 closes and reopens, the closing whereof completes a circuit from power line 464 through line 484, 510, switch 508, line 512 to the coil of relay 318. The second connection on relay 318 is made to ground 272. The energization thereby of relay 318 opens the normally closed contacts thereof which breaks the circuit to the coil of relay 282 and allows the contacts thereof to open. When the contacts of relay 282 have opened, solenoid 94 is deenergized and the upper end of gate 90 moves out of closing relationship with opening 84. Thus, the cycle of operation of the card reading and the computing devices is completed and the circuits and equipment are in readiness for the beginning of another cycle by the insertion of another card.

After the coins have been discharged into the dispensing apparatus, the hand is placed beneath the appropriate spout having the indicating marker 430 or 438 illuminated, the fingers are pressed against striker plate 232, thus closing switch 233 which makes a circuit from battery 210 through line 510, switch 233, line 512 and solenoid 230, to ground 272. When solenoid 230 is energized, it actuates coin door 224 and allows the money in the spout 218 to fall into the recipient's hand.

Assuming first that a valid card 248 is inserted in passage 96 after manual closing of switch 268 to open gate 84 through energization of solenoid 88, a summary of the operation is as follows:

Notch 254 of card 248 receives lower gate 90 and the lower edge of card 248 closes switch 104. Relay 278 is energized and remains so until switch 104 reopens. Relays 282, 288, 292 and 298 are energized by virtue of energization of relay 278. Energization of relay 282 energizes solenoid 94 to actuate gates 92, permitting further passage of card 248 and preventing entrance of additional cards 248 in passage 96.

Relay 282 is held closed through the normally closed contacts 319 of relay 318; thus, gates 90 are held in the actuated condition by energized solenoid 94 until subsequent energization of relay 318, irrespective of deenergization of relay 278 by reopening of switch 104.

Energization of relay 288 energizes relay 324 to in turn energize motor 154; relays 288 and 292 are held closed through normally closed contacts 134 and the normally closed contacts 302 of relay 304; and relay 298 is held closed through contacts 293 of relay 292. Thus, until relay 304 is subsequently energized or switch 134 opened by an invalid card, relays 288, 324, 292, 298 and motor 154 all remain energized irrespective of deenergization of relay 278 by reopening of switch 104.

Closing of relay 298 energizes solenoid 422 to actuate switch 424 and thereby either release or energize solenoid 222, moving gate 216 and illuminating either lamp 430 or 438.

As card 248 continues downwardly in passage 96, switch 104 remains closed, brushes 112 are moved out of contact with plate 110 and 111 and switch 116 is closed. As soon as brushes 112 register with openings 250 of card 248 and while switches 104 and 116 are closed, solenoid 122 is energized to move diverter plate 120 out of passage 96, and relay 346 is energized, providing a holding circuit for solenoid 122. Relay 346 is held closed through normally closed contacts 336 of relay 304, and thus, until relay 304 is subsequently energized, plate 120 will remain out of passage 96, irrespective of breaking of contact between brushes 112 and plates 110 and 111, and opening of switches 104 and 116.

As openings 252 register with brush 140 and as contacts 362 of switch 148 are held closed by card 248, solenoids 262 are energized to advance arm 264 one step for each hole 252 to position the arm 264 on one of the annular series of stationary contacts 266.

When opening 258 of card 248 registers with brush 142 and while contacts 370 of switch 148 remain closed, relay 376 is energized to energize relay 386, the latter being held by closed contacts of relay 392. Relay 392 is later energized by closing contacts of switch 244 or 244a or by closing contacts of relay 442b. Energization of relay 386 supplies energy to selected coils of the bank of relays 442.

In one use of the system hereof, a particular bus or street car route is divided into zones, for instance zones 1 to 24 extending from one end of the line or route to the other. Thus, a contact point 266 on switch 260, a conductor strip 175 and contacts 176 and 172 on disc 174 are provided for each zone. Initially a card 248 is punched through mechanism on the street car (and not here shown) and handed to a boarding passenger in return for payment of a predetermined fare covering the entire route. Such mechanism is advanced by the motorman as each zone is entered, simultaneously with advance of disc 174 and through interconnection therewith if desired. Accordingly, the number of openings 252, punched in card 248 will depend on the zone in which the passenger boards the car. And the amount of change returned to such passenger will depend on the zone in which he departs from the car.

Thus, disc 174 is advanced one position each time a new zone is entered and stands ready to determine the amount of change each passenger should receive as he leaves the bus or car in such zone. The amount of his original fare to be returned then depends on the nature of his card and how far it is able to advance the arm 264 of switch 260.

Let it be assumed that a card 248 having one opening 252 (indicating boarding in zone one) is inserted into the passage 96. Arm 264 will be advanced to contact 266a. Let it be assumed further that stationary contact 178a corresponds to contact 266a being electrically connected therewith, and that the passenger who received the card 248 in zone one, has passed through seventeen zones. The motorman will have advanced disc 174 seventeen positions, moving contact 176b, and its connecting strip 175a into engagement with stationary contact 178a. Note that disc 174 has eight annular rows of contacts 172 and corresponding for instance, from the inner row out to one penny, two pennies, three pennies, four pennies, two dimes, one nickel, one dime and nothing. This last contact indicating a full fare, is provided for closing of relay 442b described previously. Thus strip 175a is capable of returning a fare of six cents in the form of one nickel and one penny.

Since arm 166 is continuously rotated by motor 154, its brushes 168 will move into alignment with contacts 172a and 172c, that are energized by strip 175a. Brushes 168a and 168c will thus be energized to return a nickel and a penny from the respective tubes 212 or 212a as the case may be. As shown in Fig. 1, tubes 212 or 212a would eject the one penny, being energized through relay 442a. A second bank of tubes 212 (not shown), would be used to eject the nickel, this bank being energized through relay 442c.

In the event that the passenger had boarded in zone two, the card issued would have two openings 252 as shown in Fig. 14. Assuming that this passenger leaves the conveyance in the same zone as the passenger above described, this passenger then would have passed through sixteen zones having boarded one zone later than the first passenger. The disc 174 would remain in its 17th position. Arm 264 will advance to contact 266c. Let it be assumed further that stationary contact 178c corresponds to contact 266c. In its 17th position, contact 176c and its connecting strip 175c will have moved into engagement with stationary contact 178c. Contacts 172d and 172b would thus be energized when opening 258 of card 248 registered with brush 142 (Fig. 1), slip ring 261 of switch 260 being energized at this point. With arm 166 rotating, brushes 168b and 168c of arm 166 will then move into alignment with contacts 172b and 172d. Relay coils 442b and 442c will thus be energized to cause one nickel and two pennies to be ejected as previously described. The second passenger will then be refunded one cent more than the first passenger, having ridden less distance.

It is obvious that there should also be some means of informing the operator of the relative positions of brushes 112. This calls for three additional gears 74 (not shown) to be mounted to mesh with gears 74 shown in Fig. 1, these gears to move rotary arms similar to arm 299 shown in Fig. 2. Likewise, each contact arm would be provided with an annular series of contacts, equal in number to the number of positions of push rods 62 as determined by cam 66 and ratchet assembly 76. Each contact of these annular series would be connected to an individual indicator lamp, similar to lamps 462 (Fig. 2) to indicate the respective positions of brushes 112.

It is appreciated that the above sequence for disc 174 can be changed as desired or needed by merely removing, adding or rearranging the metal screws 173 to connect one or more contacts 172 with metallic strips 175 in preselected order.

Also of significance, is the manner of avoiding fraud by changing the relative positions of brushes 112 through adjustment of cam 66, and corresponding readjustment of the card punching mechanism.

The motorman will always know the position of disc 174 by virtue of calibrated lamp 462 and will be advised of the amount of fare returned to each passenger by reading lamps 454, energized through operation of disc 186.

The operation when an invalid card finds its way to plate 126 and the way in which switch 260 returns to "Home" position and the entire system made ready to receive another card to be read has been made clear above and need not be repeated.

Having thus described the invention, what is claimed as new and desired to be secured by Letters Patent is:

1. In a change return system, a number of coin containers; an electric circuit; an electrically controlled dispensing assembly for each of said coin containers respectively; a program switch having movable contact means coupled with said assemblies and a shiftable selector provided with a number of electrical conductors within the path of travel of said contact means, and a number of stationary contacts within the path of travel of said conductors; a stepping switch having a stationary contact point coupled with each of said stationary contacts respectively and a stepping arm connected with said electric circuit; and apparatus for receiving a receipt having indications formed thereon, said apparatus including means for controlling said stepping arm and adapted for operation by said indications as the receipt passes through the apparatus.

2. A change return system comprising a number of coin containers; an electric circuit; an electrically controlled dispensing assembly for each of said coin containers respectively; a program switch having movable contact means coupled with said assemblies and a shiftable selector provided with a number of electrical conductors, each having one or more contact points within the path of travel of said contact means, said program switch having a number of stationary contacts within the path of travel of said conductors; a stepping switch having a stationary contact point coupled with each of said stationary contacts respectively and a stepping arm connected with said electric circuit, and apparatus for receiving a receipt having indications formed thereon, said apparatus including means for controlling said stepping arm and adapted for operation by said indications as the receipt passes through the apparatus.

3. A change return system comprising a number of coin containers; an electric circuit; an electrically controlled dispensing assembly for each of said coin containers respectively and adapted to dispense differing amounts of change; a program switch having movable contact means coupled with said assemblies and a shiftable selector provided with a number of electrical conductors, each having one or more contact points within the path of travel of said contact means, said program switch having a number of stationary contacts within the path of travel of said conductors, said conductors being in side-by-side series, the contact points of the conductors being arranged relative to said assemblies for progressively decreased amounts of change to be dispensed as one end of the series is approached; a stepping switch having a stationary contact point coupled with each of said stationary contacts respectively and a stepping arm connected with said electric circuit; and apparatus for receiving a receipt having indications formed thereon, said apparatus including means for controlling said stepping arm and adapted for operation by said indications as the receipt passes through the apparatus.

4. In a change return system for use with receipts having indications thereon, said system including a stepping switch having a series of stationary, electrical contacts, an electrical circuit, said stepping switch having an electrical contactor, series-coupled in said circuit and movable to successively engage the contacts of the stepping switch; structure for moving said contactor; a plurality of coin dispensing assemblies; an electrical actuating device for each assembly respectively; receipt-advancing apparatus having means connected with said structure and sensitive to indications on a receipt advanced through said apparatus for controlling said structure; variable means having an electrical conductor for each of said contacts respectively and selectively engageable therewith; a number of contact points on each conductor respectively and disposed in a number of prearranged groups; and a movable electrical conductor for each of said groups respectively and connected in series with each device respectively for successive, sweeping engagement with the contact points of its corresponding groups to actuate one of said assemblies upon energization of said circuit according to the positioning of the contactor by said structure relative to the contacts of the stepping switch and according to the positioning of said conductors relative to the contacts of the stepping switch.

5. In a change return system for use with receipts having indications thereon, said system including a program switch having a series of stationary, electrical contacts, a movable disc, and an electrical sweep arm movable relative to the disc; a series of electrical conductor strips arranged on said disc for successive engagement with said contacts of the program switch as the disc is moved; a number of electrical contact points on each strip respectively; a plurality of electrical contact elements on said arm and successively engageable with said contact points as the arm is moved relative to the disc; a plurality of coin dispensing assemblies; an electrical actuating device for each assembly respectively, each of said devices being series connected with a corresponding contact element; receipt-advancing apparatus having control means sensitive to indications on a receipt advanced through said apparatus; an electric circuit; and means in said circuit and connected with said control means for coupling the circuit with a stationary contact depending upon the indications on said receipt whereby, as the sweep arm moves, and upon energization of said circuit, an assembly corresponding to said indications and within the circuit by virtue of a predetermined positioning of said disc relative to the contacts of the program switch, is actuated.

6. In a change return system for use with receipts having indications thereon, said system including a stepping switch and a program switch, each having a series of stationary, electrical contacts, the contacts of the stepping switch being series-connected with a corresponding contact of the program switch; an electrical circuit, said stepping switch having an electrical contactor, series-coupled in said circuit and movable to successively engage the contacts of the stepping switch; structure for moving said contactor, said program switch having a movable disc and an electrical sweep arm movable relative to the disc; a series of electrical conductor strips arranged on said disc for successive engagement with said contacts of the program switch as the disc is moved; a number of electrical contact points on each strip respectively; a plurality of electrical contact elements on said arm and successively engageable with said contact points as the arm is moved relative to the disc; a plurality of coin dispensing assemblies; an electrical actuating device for each assembly respectively, each of said devices being series-connected with a corresponding contact element; and receipt-advancing apparatus having means connected with said structure and sensitive to indications on a receipt advanced through said apparatus for controlling said structure whereby, as the sweep arm moves, and upon energization of said circuit, one of said assemblies is actuated according to a predetermined positioning of said disc relative to the contacts of the program switch and according to the positioning of the contactor by said structure relative to the contacts of the stepping switch.

7. In a change return system as set forth in claim 1, wherein the selector is rotatable and said conductors are arranged radially with respect to the axis of rotation of the selector.

8. In a change return system as set forth in claim 7, wherein each conductor is provided with one or more contact points disposed to present a plurality of concentric, arcuate rows thereof on the selector.

9. In a change return system as set forth in claim 8, wherein said movable contact means includes a brush for each assembly respectively, each brush being engageable with an arcuate row of said contact points.

10. In a change return system as set forth in claim 9, wherein each brush is coupled in series with an assembly and is successively engageable with the contact points of the corresponding row thereof as the contact means is moved.

PRESTON E. DU PONT.

References Cited in the file of this patent

UNITED STATES PATENTS

| Number | Name | Date |
|---|---|---|
| 363,031 | Westbrook | May 17, 1887 |
| 1,752,784 | Collins | Apr. 1, 1930 |
| 1,976,585 | Tauschek | Oct. 9, 1934 |
| 2,073,904 | Osteen | Mar. 16, 1937 |
| 2,271,397 | McDermott | Jan. 27, 1942 |
| 2,374,537 | Goldsmith | Apr. 24, 1945 |
| 2,431,058 | Manning | Nov. 18, 1947 |
| 2,438,848 | Eakins | Mar. 30, 1948 |

FOREIGN PATENTS

| Number | Country | Date |
|---|---|---|
| 354,418 | Great Britain | Aug. 13, 1931 |
| 375,264 | Great Britain (published) | Dec. 24, 1930 |
| 403,366 | Great Britain | Dec. 11, 1933 |
| 518,679 | Great Britain | Mar. 5, 1940 |